United States Patent

[11] 3,539,048

| [72] | Inventor | Anthony Fabian Austin Pearson<br>24B Upminster Road South, Rainham,<br>Essex, England |
|---|---|---|
| [21] | Appl. No. | 766,085 |
| [22] | Filed | Oct. 9, 1968 |
| [45] | Patented | Nov. 10, 1970 |
| [32] | Priority | Oct. 10, 1967 |
| [33] | | Great Britain |
| [31] | | No. 46,186/67 |

[54] MEANS FOR COLLECTING FLOTSAM
14 Claims, 6 Drawing Figs.

| [52] | U.S. Cl. | 210/242 |
|---|---|---|
| [51] | Int. Cl. | C02b 1/08 |
| [50] | Field of Search | 210/523, 83, 242, 160, (Oil Skim Digest), 400 |

[56] References Cited

UNITED STATES PATENTS

| 660,027 | 10/1900 | Proctor | 210/400X |
| 2,027,542 | 1/1936 | Lissauer | 210/400 |
| 3,314,545 | 4/1967 | Grabbe et al. | 210/242 |
| 3,326,379 | 1/1967 | Caddick | 210/523X |
| 3,348,690 | 10/1967 | Cornelissen | 210/242 |

FOREIGN PATENTS

| 833,918 | 5/1960 | Great Britain | 210/242 |

Primary Examiner—Reuben Friedman
Assistant Examiner—T. A. Granger
Attorney—Baldwin, Wight & Brown ABSTRACT: This invention relates to a device for collecting flotsam and other garbage floating on or adjacent the surface of the water in harbours and locks and the like, comprising a vessel such as a ship having endless conveyor means mounted or adapted to be mounted thereon and projects forwardly of the bow of the vessel into the water, whereby flotsam etc. in the water is gathered by the conveyor means and carried by it, upwardly, and into a collecting receptacle which may either be a hold of the ship or a barge. It will thus be appreciated that the vessel may be of single or or twin hull construction, the barge being adapted to be located between the hulls of the latter construction.

Patented Nov. 10, 1970

Inventor:
Anthony Fabian Austin Pearson
BY Baldwin Wight Diller & Brown
Attorneys

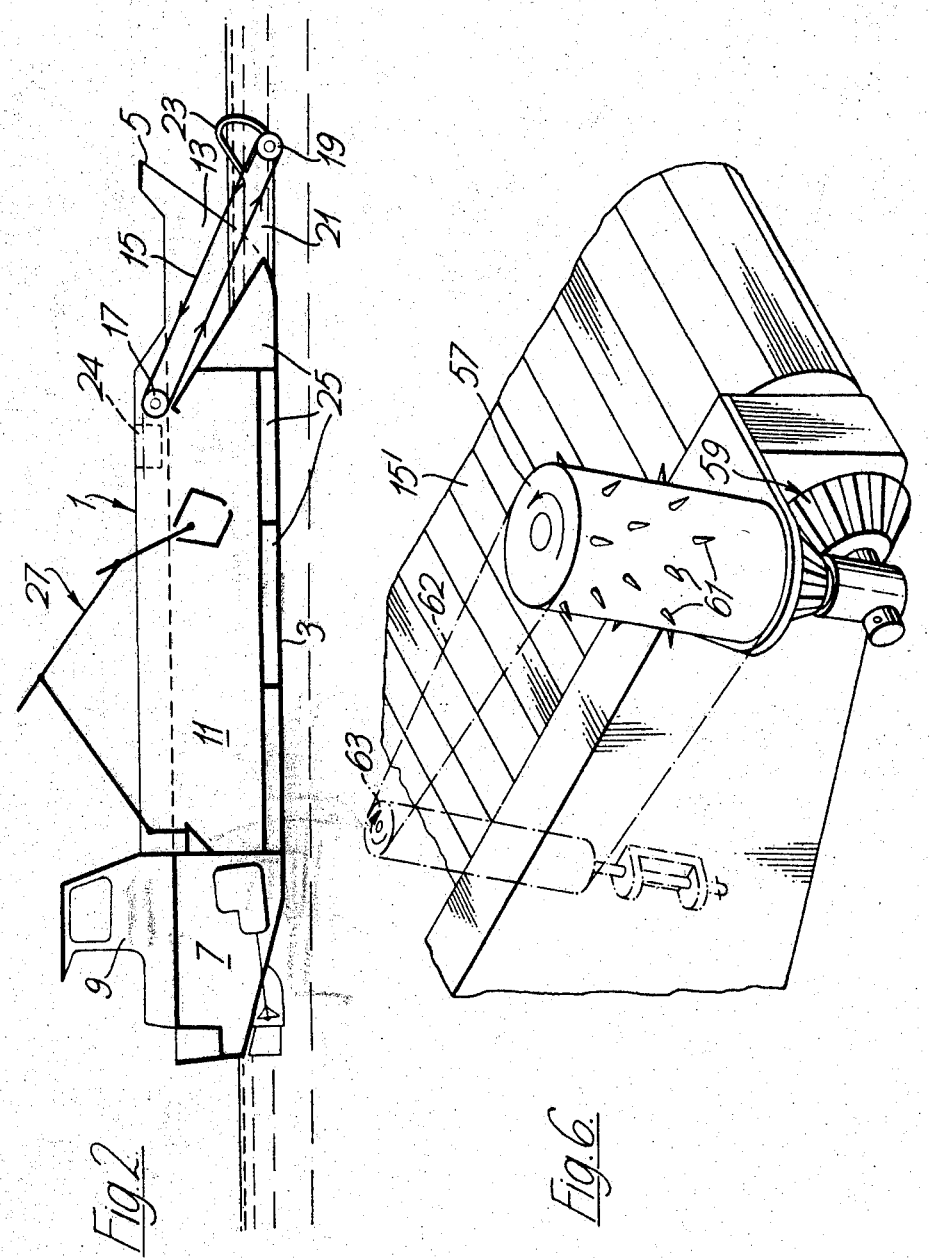

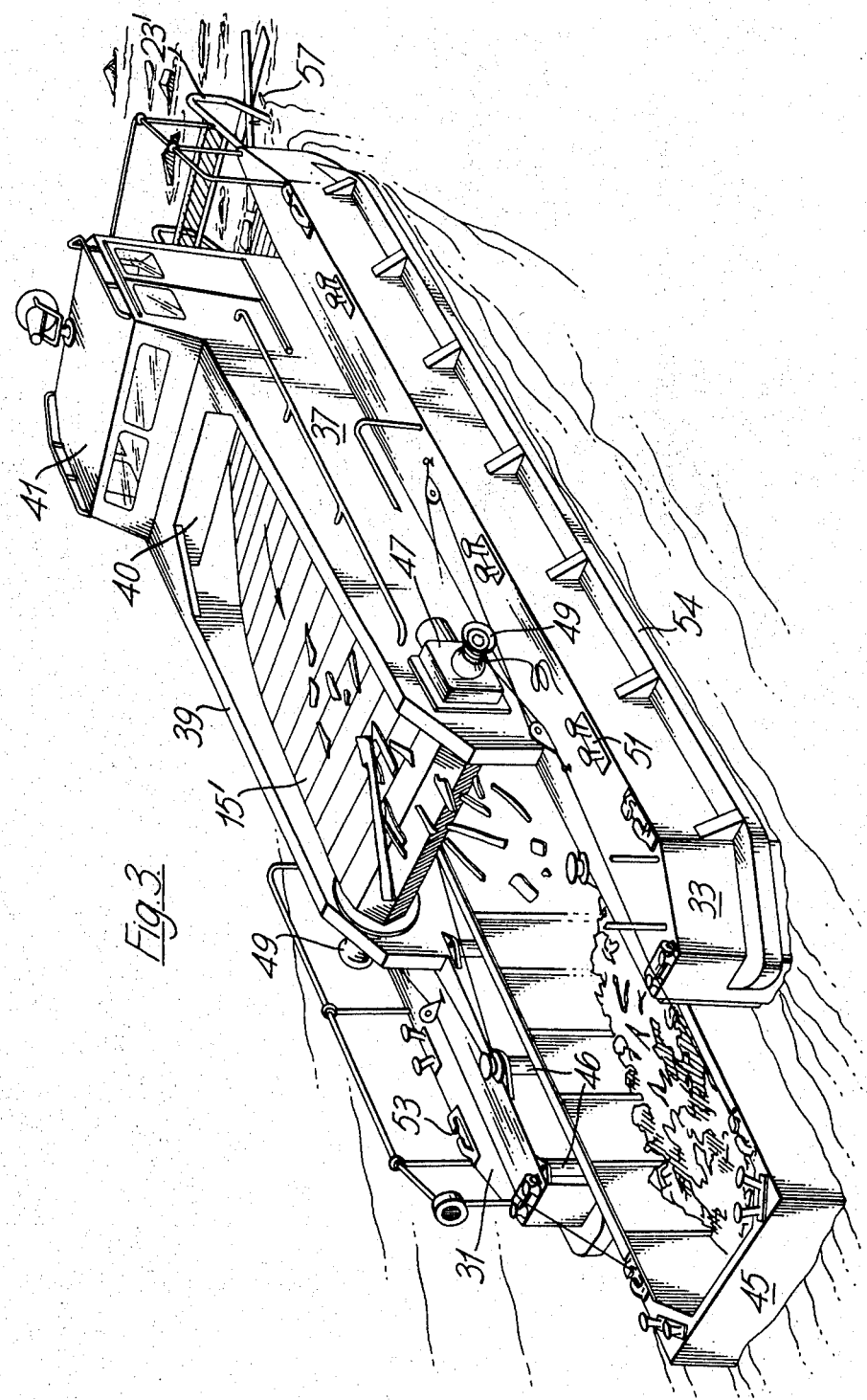

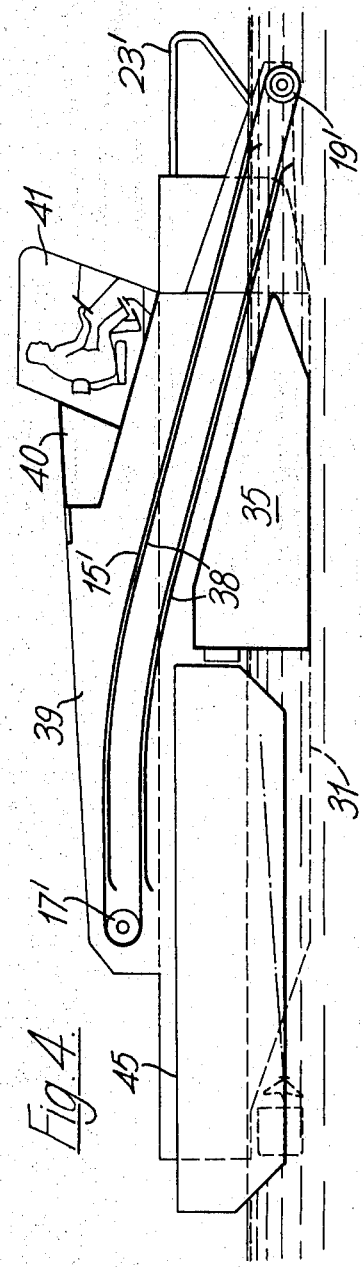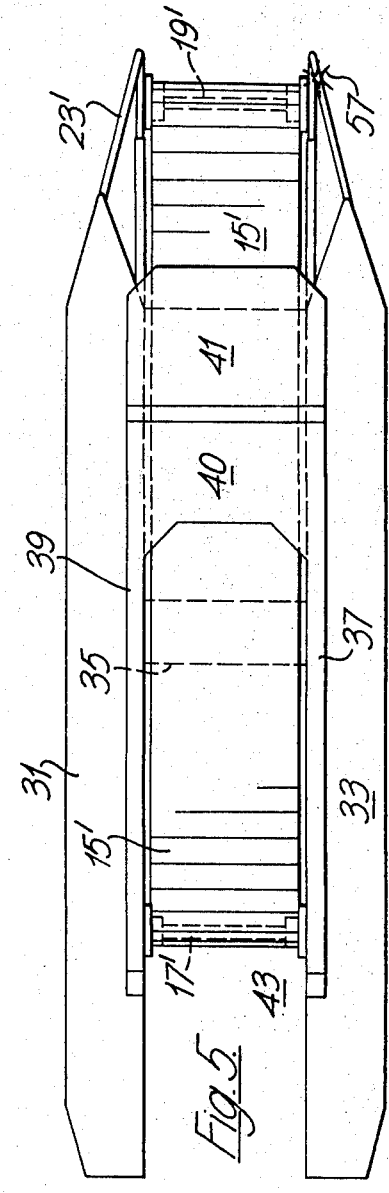

MEANS FOR COLLECTING FLOTSAM

This invention relates to apparatus for collecting flotsam and other floating garbage or rubbish, i.e. solid matter from the water, especially in and around harbours and ports.

In busy harbours and ports, whether they be sea ports or river ports, there is always a tendency for unwanted rubbish such as baulks of timber, packing cases, food waste, rags and other garbage either to be spilt or purposely thrown into the water, where most of it floats and moves backwards and forwards with the tide and gradually decays and looks and smells most unpleasant. This rubbish, if it collects around landing stages can be a hazard not only to small boats but also to all kinds of shipping in general. It is the object of the present invention to provide a device for removing such rubbish from the water.

According to the present invention, a device for collecting flotsam and other garbage floating on or adjacent the surface of the water comprises a vessel, such as a ship, endless conveyer means in association with said vessel and arranged to project, at or adjacent the bows of the vessel, into the water, to present a forwardly and downwardly inclined, substantially planar surface, and drive means for said conveyer means, whereby, when said conveyer means engages said flotsam the latter is collected on the conveyer means and carried thereby to be discharged into a collecting receptacle.

Preferably, the endless conveyer means is in the form of a belt mounted on the vessel and is preferably made of overlapping sheet steel links. It may, however, be made for example, of a wire mesh screen or alternatively, an endless belt made of plastics or rubber material, e.g. Neoprene, which may be reinforced with fabric. Spikes are provided on the conveyer belt in any combination or pattern, the spikes picking up solid matter floating on the surface of the water.

The collecting receptacle may be a hold in the vessel itself, but preferably it is separate from the vessel, in which case the vessel may be of the twin hulled type and the collecting receptacle may be a barge which can be nosed in between the twin hulls.

A device is provided on the end of the endless conveyer projecting in the water to reposition any very large pieces of flotsam which would otherwise tend to block the conveyer means. This device may comprise a spiked roller.

Two embodiments of the invention are now described with reference to the accompanying drawings, in which:

FIG. 2 is a schematic side elevational view of the embodiment of FIG. 1;

FIG. 3 is a perspective view of another embodiment;

FIG. 4 is a schematic side elevation view of the embodiment of FIG. 3;

FIG. 5 is a plan view of the embodiment of FIG. 3; and

FIG. 6 is an enlarged scrap view of part of the embodiment of FIG. 3.

Figure 1:
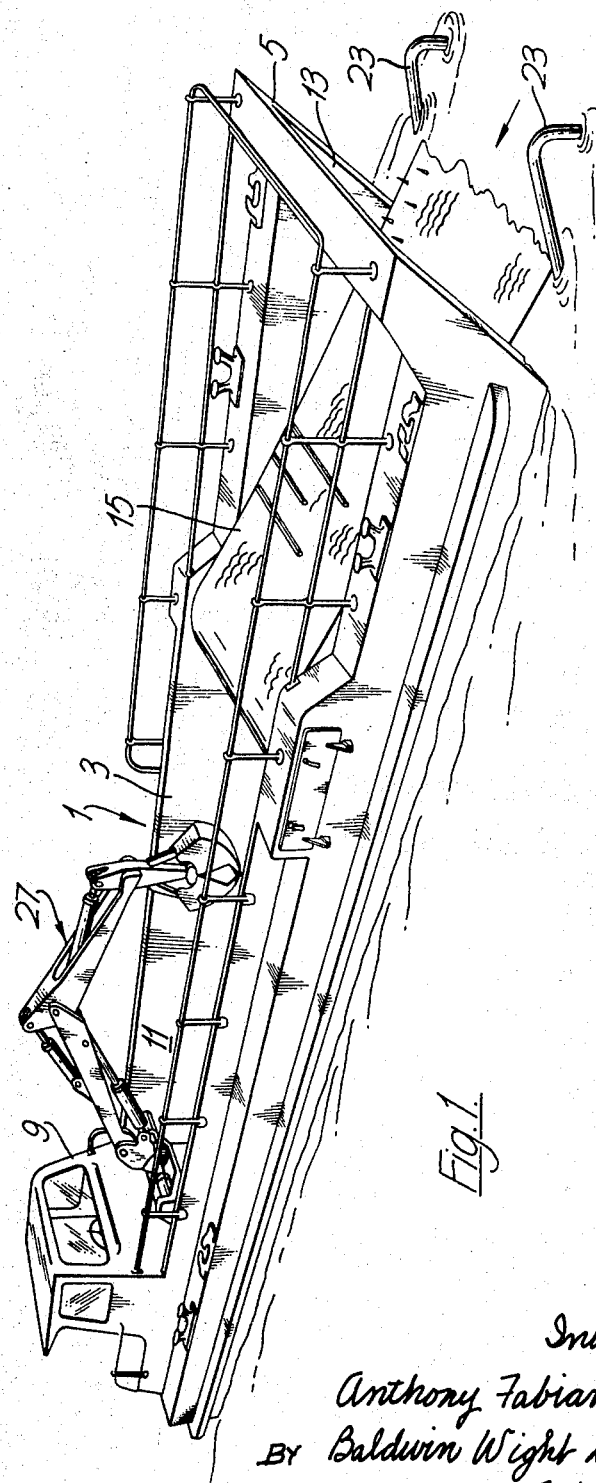
FIG. 1 is a perspective view of one embodiment.

Referring to FIGS. 1 and 2, apparatus for collecting flotsam is shown generally at 1 and comprises a ship 3 having a bow 5 similar to that to be found on a landing craft. The ship is provided with an engine compartment 7, wheel house 9, and an open topped hold 11 into which flotsam can be discharged. An opening 13 is formed in the bow 5 through which passes an inclined endless conveyer belt 15, entrained around a set of driven pulleys 17 and a further set of pulleys 19. The pulleys 17 have their axes substantially at deck level and above the forward end of the hold 11 and the pulleys 19 are mounted between two arms 21 extending forwardly from the bows 5 and beneath the water. The conveyer belt 15 extends substantially completely across the beam of the ship, and it may be made of wire mesh which may either be continuous or formed in hinged sections or of overlapping sheet steel sections. Alternatively, it could be made of a plastics or rubber composition which may be reinforced with fabric. A particularly good synthetic rubber belt is one made of Neoprene links. In all the constructions, spikes are provided, extending outwardly from the surface of the belt. At its forward end, the belt is protected at each side by fenders 23 which also form guide members as will hereinafter be described. A hydraulic motor 24 forms the drive means for the conveyer belt 15. To add buoyancy to the ship, buoyancy tanks 25 are provided.

In an alternative construction shown in FIGS. 3, 4, 5, and 6, the ship is of twin hull construction, the hulls 31 and 33 being bridged amidships by a transverse box member 35 and each housing an engine compartment. The hulls 31 and 33 are provided respectively with an upstanding wall 37, 39, and an endless conveyer 15' made of overlapping steel links, is entrained around a driving roller 17' extending between the walls 37, 39, and passes between the two hulls, over skids 38, and around a bow roller 19' beneath the waterline. The two walls 37, 39 are joined towards the bows by a box section 40 which is integral with a wheel house 41. Instead of the vessel being provided with a hold, a docking space 43 is provided between the hulls into which space may be driven a barge 45 and suitable barge chafing rollers 46 are mounted on the sides of the two hulls to assist this operation. Hence, the floating garbage and other rubbish to be collected by the endless conveyer belt 15' can be transferred directly into the barge 45 for subsequent removal. If necessary the barge can be backed out of the docking space, turned around, driven into the docking space once again to enable both ends to be filled with rubbish.

The driving roller 17' is driven by a hydraulic motor 47, and suitable warping drums 49, driven through clutches (not shown) are mounted coaxially of the roller 17'. The conveyer 15' is protected at the bows by port and starboard fenders 23'.

Each hull 31, 33 is provided with sufficient deck space to enable crewmen to handle warps etc. for the barge 45, and suitable bollards 51, fairleads 53 etc. are provided on this deck space. Fenders 54 extend along each of the hulls 31, 33 to minimise the risk of accidental damage.

In order to prevent very long or large pieces of flotsam from jamming across the bottom of the conveyer belt, a steel drum 57 is fitted to the right hand edge of the front of the conveyer. This drum 57 (see FIG. 6) has its longitudinal axis substantially normal to the axis of the roller 19' and that of the conveyer 15', and is driven anticlockwise (viewed from above), at a speed faster than that of the roller 19', by bevel gearing 59. The surface of the drum 57 is provided with a plurality of radially projecting spikes 61 about 1 inch long. It will thus be appreciated that if a baulk of timber for example, which is longer than the width of the conveyer 15, becomes jammed against the fenders 23', one end of the timber will be guided up onto the conveyer by the drum 57. In an alternative embodiment, shown in broken lines in FIG. 6, an endless conveyer 62, replaces the drum 57. This conveyer is entrained around a driven roller in place of the drum 57 and an idler roller 63, and is provided with a plurality of spikes on its surface. Although both the devices of FIG. 6 are shown as being driven from the roller 19', they could of course be driven independently.

In the construction shown in the FIGS. 1 and 2, a slewing bucket grab 27 for unloading rubbish and moving rubbish around the hold is provided. It will be appreciated that such a grab could also be provided for the twin hull construction. The bucket grab 27 is also very useful for picking up large items of flotsam, such as a baulk of timber, which is too long to be collected by the conveyer. In operation, the vessel is driven towards the flotsam and the conveyer belt is put in motion so that it moves in the direction shown by the arrows. The vessel is then nosed into the flotsam so that the leading edge of the conveyer belt passes underneath the flotsam and as the vessel is advanced further into the flotsam, so it will be collected up on the conveyer belt, conveyed up over the set of pulleys 17 or the roller 17' and will hence fall by gravity into the hold 11 or the barge 45. Any large baulks of timber or other material will be guided by the members 23, or by the twin bows in the second embodiment, either on to the conveyer or alternatively, will be pushed away from the conveyer if the conveyer is incorrectly positioned with respect to them, unless the device of FIG. 6 is fitted, in which case they will be repositioned and guided onto the conveyer. It will be appreciated that, depending upon the nature of the conveyer belt, rubbish of varying size and weight can be "swept up" from the surface of the water into the hold or into the barge.

An alternative construction is envisaged in which the conveyer means is formed as a separate unit adapted to be connected to the bows of a vessel. Preferably such a unit will float and could be floated from one container vessel to another.

If required, the conveyer could be lifted from the water whenever it is not in use, to make travelling from one place to another easier. Alternatively, and preferably, a plate if fitted to the outboard end of the belt with the dual purposes of acting as a hydrofoil so as to counteract the drag of the conveyer belt during movement of the vessel, but also to prevent the conveyer belt from fouling the ground when working in very shallow water.

A special version of vessel is also envisaged which is intended to collect floating weed or to cut and collect floating weed. The belt itself would be modified in size and the arrangement of spikes, and for cutting the weed, an agricultural type harvesting shear cutter in special materials would be fitted below and slightly forward of the submerged end of the belt.

It will be appreciated that modifications can be made to both types of vessel. For example, the twin hulled vessel could have an extra box section unit adjacent the stern, in the vicinity of the roller 17', above deck level, and the outline of the vessel may be very different. The side walls 37 and 39 are not essential, and the wheel house and the stern box section unit may provide two separate superstructures, which would preferably be connected by a guard rail.

I claim:

1. A device for collecting flotsam and other solid matter floating on and adjacent to the surface of the water comprising a vessel; a collecting receptacle; endless conveyer means in association with said vessel and projecting forwardly, adjacent to the bow of the vessel, into the water; a plurality of spikes projecting from the surface of said conveyer means to present a forwardly and downwardly inclined, spiked surface; drivable means movably mounted on said vessel adjacent the end of the endless conveyer means and projecting into the water and being operable to reposition any very large pieces of flotsam and other solid matter which would otherwise tend to block said conveyer means; means for driving said drivable means; and drive means for said conveyer means, whereby, when said conveyer means engages said flotsam, the latter is collected on the conveyer means and carried thereby to be discharged into said collecting receptacle.

2. A device according to claim 1, in which said drivable means adjacent the end of the endless conveyer means comprises a driven roller provided with spikes projecting radially from its surface.

3. A device according to claim 1, in which said drivable means adjacent the end of the endless conveyer means comprises a driven endless conveyer belt with spikes projecting from its surface.

4. A device according to claim 1, in which said endless conveyer means comprises a belt mounted on said vessel.

5. A device according to claim 4, in which said belt is made of overlapping steel links.

6. A device according to claim 4, in which said belt is made of a wire mesh screen.

7. A device according to claim 4, in which said belt is made of rubber.

8. A device according to claim 7, in which said rubber is reinforced with fabric.

9. A device according to claim 1, in which said collecting receptacle comprises a hold in the vessel.

10. A device according to claim 1, in which said collecting receptacle comprises a barge and in which the vessel is of the twin hull type, the arrangement being such that the barge can be nosed in between the twin hulls.

11. In a marine vessel, means for collecting flotsam and other solid matter floating on the surface of the water, including a vessel hold open at its top; two pulley means, one substantially amidships and overlying said hold, and the other positioned forwardly of the vessel bow and beneath the water line; and endless conveyer entrained around said two pulley means and extending toward and projecting beyond said bow; a plurality of spikes projecting from the surface of said conveyer; drivable means movably mounted on said vessel adjacent the projecting end of said endless conveyer and being operable to reposition any very large pieces of flotsam and other solid matter which would otherwise tend to block said conveyer; means for driving said drivable means; and drive means for said conveyer whereby when the vessel is driven into a pile of flotsam and solid matter with said drive means in operation, said conveyer will collect said flotsam and solid matter and convey it into said hold.

12. A marine vessel according to claim 11, including a bucket grab; and means mounting said grab toward the stern of said vessel.

13. A twin hulled marine vessel for collecting flotsam and other solid matter floating on and adjacent the surface of the water, including a driven conveyer roller; means mounting said driven conveyer roller between the vessel hulls; drive means for said driven roller carried by one of said hulls; an idler conveyer roller; means mounting said idler roller forwardly of said hulls beneath the waterline and between said hulls; an endless conveyer entrained around said rollers and having upper and lower runs; support means for the upper run of said conveyer between said rollers; a plurality of spikes projecting from the surface of said conveyer; at least one rotatable spiked device adjacent said idler roller to reposition any large pieces of flotsam and other solid matter so that it lies substantially completely on said conveyer; and means to rotate said device, whereby, when the vessel is driven into a pile of flotsam and other solid matter with said conveyer and device in operation, said conveyer will collect said flotsam and solid matter and convey it up and over said driven roller to fall into a barge located beneath said driven roller and between said hulls.

14. A vessel according to claim 13, including barge chafing rollers on the inside of said hulls; and means for securing said barge between said hulls.